(12) United States Patent
Fieger et al.

(10) Patent No.: US 11,543,632 B2
(45) Date of Patent: Jan. 3, 2023

(54) OPTICAL LENS SYSTEM WITH AT LEAST TWO LENSES FIRMLY BONDED TO EACH OTHER

(71) Applicant: Hella GmbH & Co. KGaA, Lippstadt (DE)

(72) Inventors: Markus Fieger, Unna (DE); Heinrich Schäfer, Bad Wünnenberg (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 215 days.

(21) Appl. No.: 16/480,544

(22) PCT Filed: Feb. 6, 2018

(86) PCT No.: PCT/EP2018/052885
§ 371 (c)(1),
(2) Date: Jul. 24, 2019

(87) PCT Pub. No.: WO2018/146065
PCT Pub. Date: Aug. 16, 2018

(65) Prior Publication Data
US 2019/0384037 A1 Dec. 19, 2019

(30) Foreign Application Priority Data
Feb. 8, 2017 (DE) .................... 10 2017 102 465.4

(51) Int. Cl.
| | | |
|---|---|---|
| G02B 1/00 | (2006.01) |
| G02B 13/00 | (2006.01) |
| G02B 7/02 | (2021.01) |
| B29D 11/00 | (2006.01) |
| B29L 11/00 | (2006.01) |
| G02B 3/00 | (2006.01) |

(52) U.S. Cl.
CPC .......... *G02B 13/006* (2013.01); *G02B 7/021* (2013.01); *B29D 11/00403* (2013.01); *B29L 2011/0016* (2013.01); *G02B 2003/0093* (2013.01)

(58) Field of Classification Search
CPC .................. G02B 13/006; G02B 7/021; G02B 2003/0093; G02B 19/0014; B29D 11/00403; B29L 2011/0016
USPC .......................................................... 359/642
See application file for complete search history.

(56) References Cited

U.S. PATENT DOCUMENTS 5,349,472 A * 9/1994 Terai ........................ G02B 3/12
359/796
6,007,210 A 12/1999 Yamamoto et al.
(Continued)

FOREIGN PATENT DOCUMENTS

| | | |
|---|---|---|
| DE | 102010004825 A1 | 7/2011 |
| DE | 102011004086 A1 | 8/2012 |
| WO | 2016/003275 A1 | 1/2016 |

*Primary Examiner* — James C. Jones
(74) *Attorney, Agent, or Firm* — Husch Blackwell LLP

(57) ABSTRACT

An optical lens system is provided with at least two lenses firmly bonded to each other. A first lenshas a first adhered surface and a second lens has a second adhered surface. The adhered surfaces are at least indirectly firmly bonded to each other. An optically transparent surface body made of a silicone material is arranged between the adhered surfaces. The first adhered surface is firmly bonded to a first side and the second adhered surface is firmly bonded with the opposite second side of the sheet body by means of a bonding method.

11 Claims, 2 Drawing Sheets

(56) References Cited

U.S. PATENT DOCUMENTS

2003/0086184 A1    5/2003   Abe et al.
2013/0107113 A1*   5/2013   Tazoe .................... G02B 7/021
                                                    348/374

* cited by examiner

OPTICAL LENS SYSTEM WITH AT LEAST TWO LENSES FIRMLY BONDED TO EACH OTHER

CROSS REFERENCE

This application claims priority to PCT Application No. PCT/EP2018/052885, filed Feb. 6, 2018, which itself claims priority to German Patent Application 10 2017 102465.4, filed Feb. 8, 2017, the entirety of both of which are hereby incorporated by reference.

FIELD OF THE INVENTION

The invention relates to an optical lens system with at least two lenses firmly bonded to each other, whereby a first lens, a first adhered surface and a second lens have a second adhered surface, and where the adhered surfaces are at least indirectly firmly bonded to each other.

BACKGROUND

DE 10 2010 004 825 A1 describes an optical lens system with two lenses that are manufactured from glass firmly bonded to each other. In order to firmly bond the two lenses, these are pressed against each other and directly glued involving softening of the glass material, where the softening area of at least one of the two glasses is reached. The glasses are correspondingly heated for this purpose. One disadvantage here is that a high level of technological effort is needed to bond the two lenses. Particularly in the case of plano-convex lenses or plano-concave lenses, the two planar surfaces have to be bonded together to form optical lens systems. As lenses for optical lens systems, especially those for headlights, are not ground but are manufactured already with the final contour using a pressing method, deviations of the planar surface from an ideal planar surface can lead to a situation where the two planer surfaces are not in contact with each other over the entire surface when they are mated. In this respect, topographical surface deviations form gaps in the sub-micrometer range that can have an optical effect on the light collimated or shaped by the optical lens system. Consequently, simple options for the firm bonding of at least two lenses especially by means of their planar surfaces are desirable, where any planar deviations of the planar surfaces can be neglected to the greatest possible extent.

SUMMARY OF THE INVENTION

The task of the invention is the refinement of an optical system with at least two lenses firmly bonded to each other that can be manufactured simply. In particular, it is to be made possible for surfaces of the lenses manufactured to complement each other to be firmly bonded to each other in a simple manner, where there should be the possibility of compensating for deviations in the shape of the adhered surfaces.

The invention includes the technical contribution that there is a optically transparent surface body made of a silicone material arranged between the adhered surfaces, where the first adhered surface is firmly bonded to a first side and the second adhered surface is firmly bonded with the opposite second side of the surface body by means of a bonding method.

A bonding process is based on a previous surface functionalization by chemically reactive groups being generated on the surface that react to each other under the influence of temperature and pressure. This reaction gives rise to a permanently solid connection between the surfaces to be joined, where there is essentially no influence exerted on the joining materials. In this respect, a bonded connection forms in particular an optically unobstructed connection between two materials, where the surface functionalization may in particular comprise plasma activation or what is known as corona treatment. Consequently, in the present case, it is possible for either the surface of the transparent surface body, and thus of the silicone material, or the adhered surface to be activated, where in particular it is also possible to activate both surfaces to be joined.

The special advantage of the invention consists of an optically high-grade transition between the two lenses. In particular, it is possible to compensate for deviations from an ideal planar surface that might be present on the adhered surfaces by means of the flexible silicone material of the transparent surface body. Moreover, no further adhesives are required and the process can take place without any heating up of at least one of the two lenses into a softening area, which is the case for example when the lenses are manufactured from glass.

For example, the first lens and/or the second lens forms a plano-convex lens or a plano-concave lens, where the planar side forms the adhered surface. Where two plano-convex lenses are mated using the adhered surfaces and bonded to each other, it is possible to create a biconvex lens as an optical lens system. If the lenses, especially ones consisting of glass material, are manufactured using a pressing method without the lenses being subject to a grinding process, the volumes of the glass material to be produced are limited especially with regard to the thickness of the lenses. Consequently, biconvex lenses have a two-piece design made of two plano-convex lenses, where the two planar sides are mated to each other such that the volume of the each lens to be hot pressed is reduced. If the bonding process is performed, it can be preceded by a surface activation of the planar surfaces of the two plano-convex lenses or plano-concave lenses. As defined by the present invention, a lens can even include a degenerate lens with an infinite radius, such that one of the two lenses merely forms a disk, for example. Consequently, it is also conceivable for a plano-convex lens to be bonded to a disk so that, ultimately, a plano-convex lens is again formed as an optical lens system.

The first lens and/or the second lens can be made of a glass material or a silicone material to provide further advantages. Glass and/or silicone are bondable materials. It is also conceivable that at least one or both of the lenses is made of a plastic material, where the adhered surface of the lens manufactured from a plastic material has a bondable coating to allow the bonding process to be performed.

The bondable coating can be correspondingly activated such that the bonding process can consequently be performed. As a result, it is also possible to manufacture optical lens systems with a combination of plastic/glass/silicone.

As a further advantage, the transparent surface body is formed in a way that protrudes around the circumference of the lens and has at least one functional shape. The area of the surface body located between the two adhered surfaces of the lenses can be designed to be thin, for example with a dimension of around 1 mm or less. In this respect, the edge area of the surface body can have functional shapes in order to allocate to the surface body further functions over and above acting to connect the two lenses.

It is possible, for example, for the functional shape to have a sealing lip that is designed to run around the lenses. It is also possible for the sealing lip to form a kind of rib that can be used to seat the lens system in a mounting. Finally, there is also the possibility of the functional shape including a means of centering and/or a carrying holder for at least one of the lenses.

The invention continues to address a method for manufacturing an optical lens system with at least two lenses firmly bonded to each other, whereby a first lens has a first adhered surface and a second lens has a second adhered surface, where the adhered surfaces are at least indirectly firmly bonded to each other, where the method involves at least the following steps: Arrangement of an optically transparent surface body made of a silicone material between the two adhered surfaces and firm bonding of at least one of the adhered surfaces with an allocated side of the surface body by means of a bonding process.

It is particularly advantageous when the first adhered surface of the first lens is bonded with a first side of the surface body and the second adhered surface of the second lens is bonded with an opposite second side of the surface body. In this context, it is also conceivable that the bonding processes is performed only between one lens and the surface body.

According to a variant of the method, it is also possible for the first lens and/or the second lens to be composed of a plastic material, where the adhered surface of the lens formed from a plastic material is provided with a bondable coating prior to bonding with the surface body. The bondable coating can be correspondingly activated in order to perform the bonding process with the surface body. It is even possible for lenses made of a plastic material to be produced using a pressing method to form the final contour, such that the advantages of the mechanically flexible surface body made of silicone material can also be exploited for plastic lenses.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
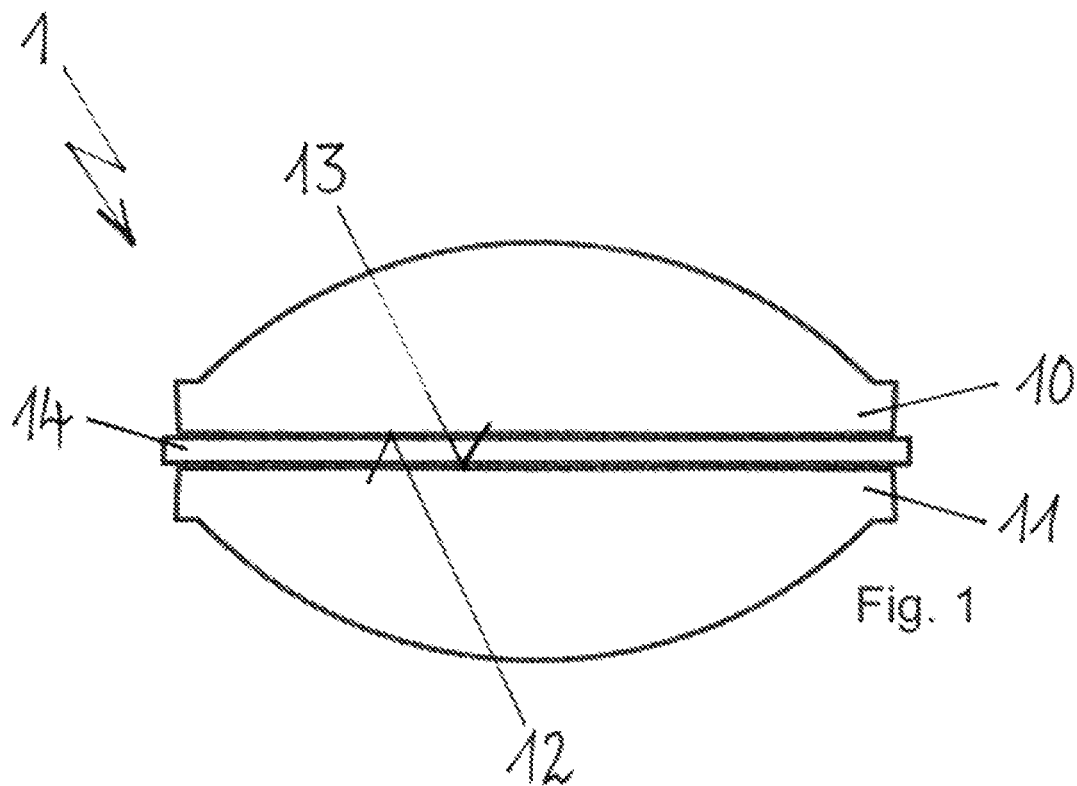
FIG. 1 is a sample embodiment of an optical lens system with a first and a second plano-convex lens.

FIG. 1 shows a sample embodiment of an optical lens system 1 with a first lens 10 and a second lens 11. There is a surface body 14 between the two lenses 10 and 11. Both lenses 10, 11 are, as an example, designed as plano-convex lenses. Other lens shapes are also possible, however, for example plano-concave lenses or concave-convex lenses. In particular, the two adhered surfaces do not have to be planar, but they should, however, have a matching profile. The surface body 14 consequently does not have to extend in a plane and can also follow a curve of the lenses 10 and 11.

The first lens 10 has a first adhered surface 12 and the second lens 11 has a second adhered surface 13. The first adhered surface 12 is bonded to a first side of the surface body (14) applying a bonding process. The second adhered surface 13 is bonded with the opposite second lateral surface of the surface body 14 likewise applying a bonding process. This results in an optical lens system 1 with an optically high-grade transition between two lenses 10 and 11, which together form a biconvex lens.

Figure 2:
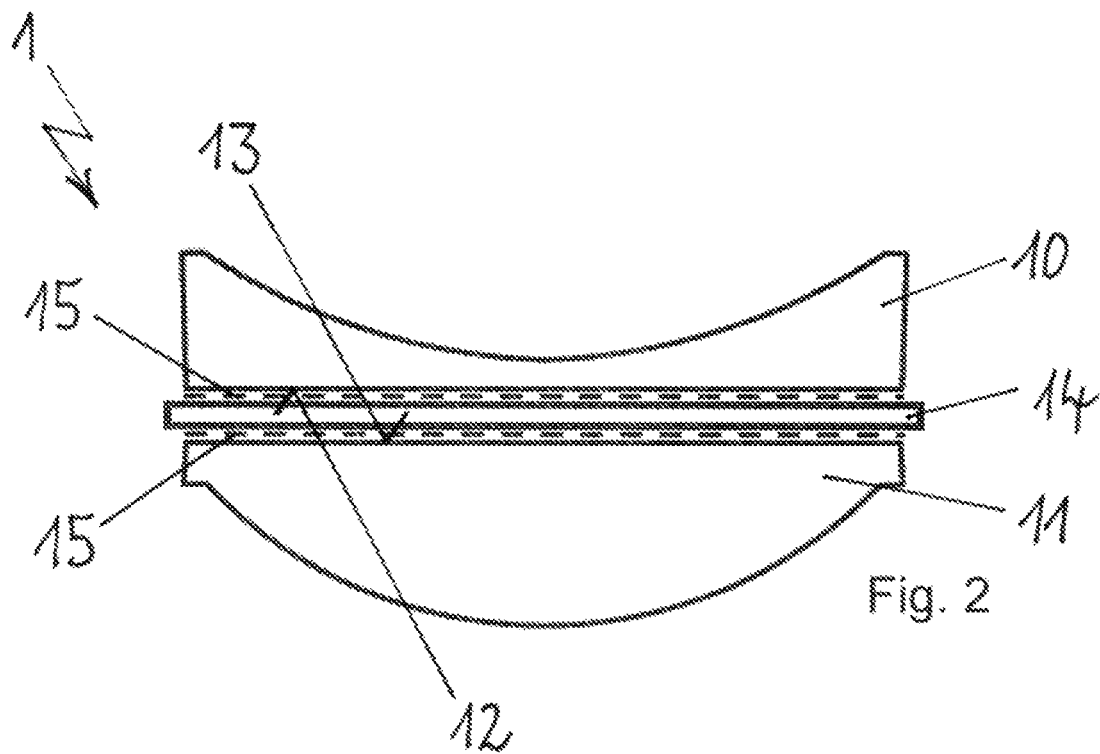
FIG. 2 is a sample embodiment of an optical lens system with a plano-concave lens and a plano-convex lens, where the adhered surfaces of the lenses have a bondable coating.

FIG. 2 shows a modified sample embodiment of an optical lens system with, as an example, two lenses 10 and 11 that comprise a plastic material. To make the plastic material bondable, the adhered surfaces 12 and 13 of the lenses 10 and 11 manufactured from plastic each have a bondable coating 15. Consequently, it is also possible to bond lenses 10 and 11 made of a plastic material with the surface body 14 made of a silicone material in contact with the surface body 14, applying a bonding process. This results in a convex-concave lens, where the bondable coating is implemented is such a way that it does not detract from the optical quality of the optical lens system 1 or at least not materially.

Figure 3:
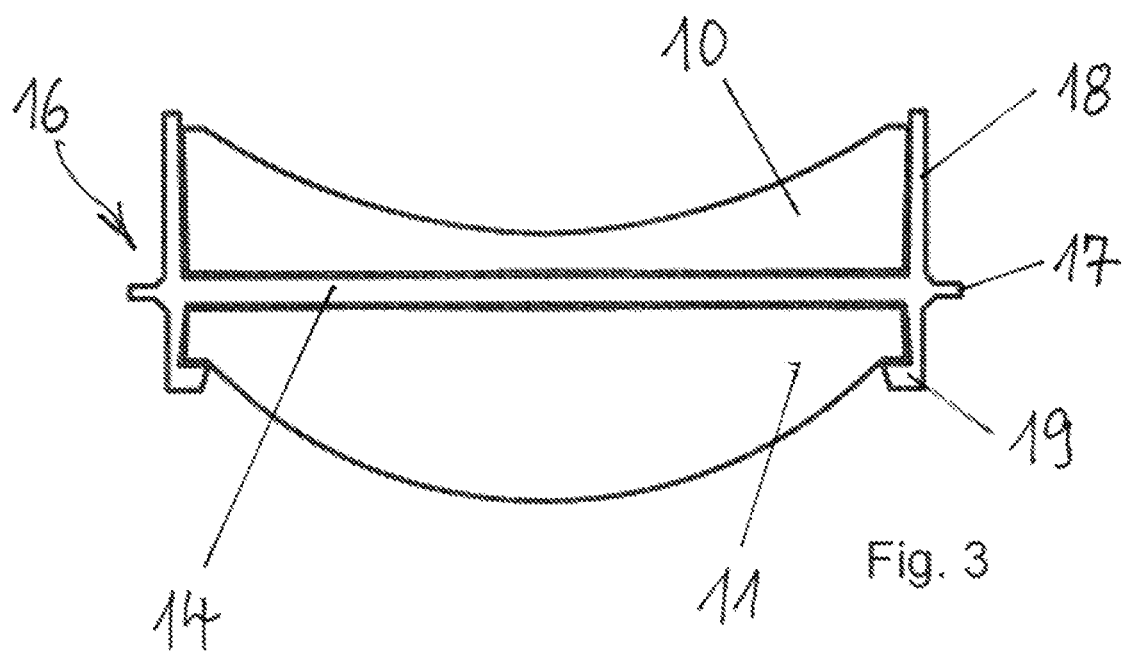
FIG. 3 is a sample embodiment of an optical lens system with a surface body between two lenses, where the surface body comprises functional shapes at the edge.

FIG. 3 shows a further sample embodiment of an optical lens system 1 with a first lens 10 and with a second lens 11. There is an optically transparent surface body 14 made of a silicone material between the two lenses 10 and 11. Both lenses 10 and 11 are firmly bonded at the lateral areas of the surface body 14 applying a bonding process.

The sample embodiment shows a refinement of the sample embodiment 14 with functional shapes 16 formed at the edge. The functional shapes 16 comprise, for example, a circumferential sealing lip 17, which can also service as mounting rib for mounting in a lens holder. In addition, a means of centering 18 is shown as an example that centers the first lens 10 to the second lens 11.

The functional shape 16 furthermore comprises a mount 19 for the second lens 11, so that the surface body 14, for example can be mounted to be self-retaining and positively fastened at the second lens 11.

The design of the invention is not limited to the preferred embodiment specified here. Rather, a number of variants are conceivable, which make use of the present solution even in designs of a fundamentally different type. All of the features and/or advantages arising from the claims, description or drawings, including design details or physical layout and process steps, may be vital to the invention both by themselves and in a wide variety of combinations.

LIST OF REFERENCE NUMBERS

1 Optical lens system
10 Lens
11 Lens
12 First adhered surface
13 Second adhered surface
14 Surface body
15 Bondable coating
16 Functional shape
17 Sealing lip
18 Means of centering
19 Mount for lens

The invention claimed is:
1. An optical lens system comprising:
at least two lenses firmly bonded to each other, wherein a first of the at least two lenses has a first adhered surface and a second of the at least two lenses has a second adhered surface, and wherein the adhered surfaces are at least indirectly firmly bonded to each other; and
an entirely flat, optically transparent surface body made of a silicone material arranged between the adhered surfaces, where the first adhered surface is firmly bonded to a first side and the second adhered surface is firmly bonded with the opposite second side of the surface body via a bonding method, wherein the transparent surface body extends radially outwardly beyond the first adhered surface and the second adhered surface.

2. An optical lens system comprising:

at least two lenses firmly bonded to each other, wherein a first of the at least two lenses has a first adhered surface and a second of the at least two lenses has a second adhered surface, and wherein the adhered surfaces are at least indirectly firmly bonded to each other, an optically transparent surface body made of a silicone material arranged between the adhered surfaces, where the first adhered surface is firmly bonded to a first side and the second adhered surface is firmly bonded with the opposite second side of the surface body via a bonding method, and wherein the transparent surface body extends radially outwardly beyond the first adhered surface and the second adhered surface.

3. The optical lens system in accordance with claim 2, wherein at least one of the first lens and the second lens is composed of a glass material or a silicone material.

4. The optical lens system in accordance with claim 2, wherein at least one of the first lens and the second lens is composed of a plastic material, wherein the adhered surface of the lens formed from a plastic material has a bondable coating.

5. The optical lens system in accordance with claim 2, wherein the transparent surface body protrudes beyond the lens around the circumference and has at least one functional shape.

6. The optical lens system in accordance with claim 5, wherein the functional shape has a sealing lip, that is formed in a way that runs around the lenses.

7. The optical lens system in accordance with claim 6, wherein the functional shape comprises a means of centering and/or a carrying holder for at least one of the lenses.

8. A method for manufacturing an optical lens system comprising the steps of:

providing at least two lenses firmly bonded to each other, whereby a first of the at least two lenses has a first adhered surface and a second of the at least two lenses has a second adhered surface, where the adhered surfaces are at least indirectly firmly bonded to each other;

arranging an optically transparent surface body made from a silicone material between the two adhered surfaces such that the transparent surface body extends radially outwardly beyond the first adhered surface and the second adhered surface; and firmly bonding at least one of the adhered surfaces with an allocated side of the surface body by means of a bonding method.

9. The method in accordance with claim 8, wherein the first adhered surface of the first lens is bonded with a first side of the surface body and the second adhered surface of the second lens is bonded with an opposite second side of the surface body.

10. The method in accordance with claim 8 wherein at least one of the first lens and the second lens is composed of a plastic material, where the adhered surface of the lens formed from a plastic material is provided with a bondable coating prior to bonding with the surface body.

11. The optical lens system in accordance with claim 2, wherein at least one of the first lens and the second lens is a plano-convex lens or a plano-concave lens, where the planar side forms the adhered surface.

* * * * *